United States Patent
Packham et al.

(10) Patent No.: US 10,289,465 B2
(45) Date of Patent: May 14, 2019

(54) GENERATING TAILORED ERROR MESSAGES

(71) Applicant: International Business Machines Corporation, Armonk, NY (US)

(72) Inventors: Seth M. Packham, Apex, NC (US); Aaron J. Quirk, Cary, NC (US); Lee J. Reamsnyder, Carrboro, NC (US); Yun Wang, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 15/244,396

(22) Filed: Aug. 23, 2016

(65) Prior Publication Data

US 2018/0060157 A1     Mar. 1, 2018

(51) Int. Cl.
 *G06F 11/00* (2006.01)
 *G06F 11/07* (2006.01)
 *G06F 17/30* (2006.01)

(52) U.S. Cl.
 CPC ........ *G06F 11/0775* (2013.01); *G06F 11/076* (2013.01); *G06F 11/0769* (2013.01); *G06F 17/30528* (2013.01); *G06F 17/30867* (2013.01)

(58) Field of Classification Search
 CPC ...... G06Q 10/0637; G06N 5/022; G06N 5/04; G06N 99/005; G06N 3/004; G06F 11/079; G06F 11/0703; G06F 11/0793; G06F 11/2257; G06F 17/2785; G06F 17/30587
 See application file for complete search history.

(56) References Cited

U.S. PATENT DOCUMENTS

| | | | | |
|---|---|---|---|---|
| 5,121,475 A | * | 6/1992 | Child | G06F 11/0781 714/46 |
| 5,371,883 A | * | 12/1994 | Gross | G06F 11/3688 714/38.1 |
| 5,483,637 A | * | 1/1996 | Winokur | H04L 43/00 714/26 |
| 5,619,621 A | * | 4/1997 | Puckett | G06F 11/2257 706/45 |
| 6,012,152 A | * | 1/2000 | Douik | G06F 11/0709 714/26 |
| 6,092,118 A | * | 7/2000 | Tsang | H04L 69/18 709/207 |
| 6,269,460 B1 | * | 7/2001 | Snover | G06F 11/0787 714/48 |

(Continued)

OTHER PUBLICATIONS

Akgun et al., "The Effect of Apologetic Error Messages and Mood States on Computer Users' Self-Appraisal of Performance," Academia, 31 pages, First received: Feb. 14, 2008; revision received Sep. 17, 2008. https://www.academia.edu/249090/The_Effect_Of_Apologetic_Error_Messages_And_Mood_States_On_Computer_Users_Self-Appraisal_Of_Performance.

*Primary Examiner* — Bryce P Bonzo
*Assistant Examiner* — Jeison C Arcos
(74) *Attorney, Agent, or Firm* — Daniel C. Housley

(57) ABSTRACT

A computer system may encounter an error and receive information regarding the error and the user. The system may use information about the user to generate a message generation profile for the user. The system may use the message generation profile and the information about the error to generate a user-tailored message. The system may monitor the reaction of the user to an error message, and consider the information associated with the reaction when generating user-tailored error messages, subsequently.

20 Claims, 6 Drawing Sheets

(56) References Cited

U.S. PATENT DOCUMENTS

| | | | |
|---|---|---|---|
| 6,438,716 B1 | 8/2002 | Snover | |
| 6,529,954 B1* | 3/2003 | Cookmeyer, II | H04L 41/16 706/47 |
| 6,594,697 B1 | 7/2003 | Praitis et al. | |
| 7,216,144 B1* | 5/2007 | Morris | H04L 12/1818 709/204 |
| 2002/0194320 A1* | 12/2002 | Collins | H04L 41/0213 709/223 |
| 2003/0172127 A1* | 9/2003 | Northrup | G06Q 10/10 709/219 |
| 2004/0010586 A1* | 1/2004 | Burton | H04L 41/0681 709/224 |
| 2006/0179363 A1* | 8/2006 | LaBanca | G06F 11/2257 714/57 |
| 2008/0005325 A1* | 1/2008 | Wynn | G06Q 10/107 709/225 |
| 2009/0271232 A1* | 10/2009 | Waguet | G06Q 10/06 705/7.36 |
| 2011/0022465 A1 | 1/2011 | Malleshaiah et al. | |
| 2011/0119219 A1* | 5/2011 | Naifeh | H04L 41/0604 706/47 |
| 2012/0151272 A1* | 6/2012 | Behrendt | G06F 9/542 714/39 |
| 2013/0332272 A1 | 12/2013 | Bohannon et al. | |
| 2013/0346067 A1 | 12/2013 | Bhatt | |
| 2015/0199229 A1* | 7/2015 | Amendjian | G06F 11/0769 714/57 |

* cited by examiner

GENERATING TAILORED ERROR MESSAGES

BACKGROUND

The present disclosure relates generally to the field of error message generation, and more particularly to customizing error messages based on the user.

Applications display error messages when abnormal conditions occur. Error messages can be displayed on a display interface (e.g., a GUI) that provides the user with information regarding the abnormality. The error messages can be generated by the application itself, or a separate error message subsystem can be used to load error messages from an external source (e.g., a database) into the application.

In these application-based and subsystem-based systems, error messages typically consist of a template (e.g., "file not found") with limited contextual information (e.g., a particular filename) to arrive at a standard error message (e.g., "file miscellaneous.txt not found").

SUMMARY

Disclosed herein are embodiments of a method, system, and computer program product for generating error messages. Information about a user is received. The information is analyzed to form a message generation profile tailored to the user. In response to detecting an error in an application, a default message and classification of the error is determined. The message generation profile is compared to the default message and the classification of the error to form a modification assessment. In response to determining the modification assessment meets a threshold, the default message is adjusted to a user-tailored message. The user is notified of the error using the user-tailored message.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
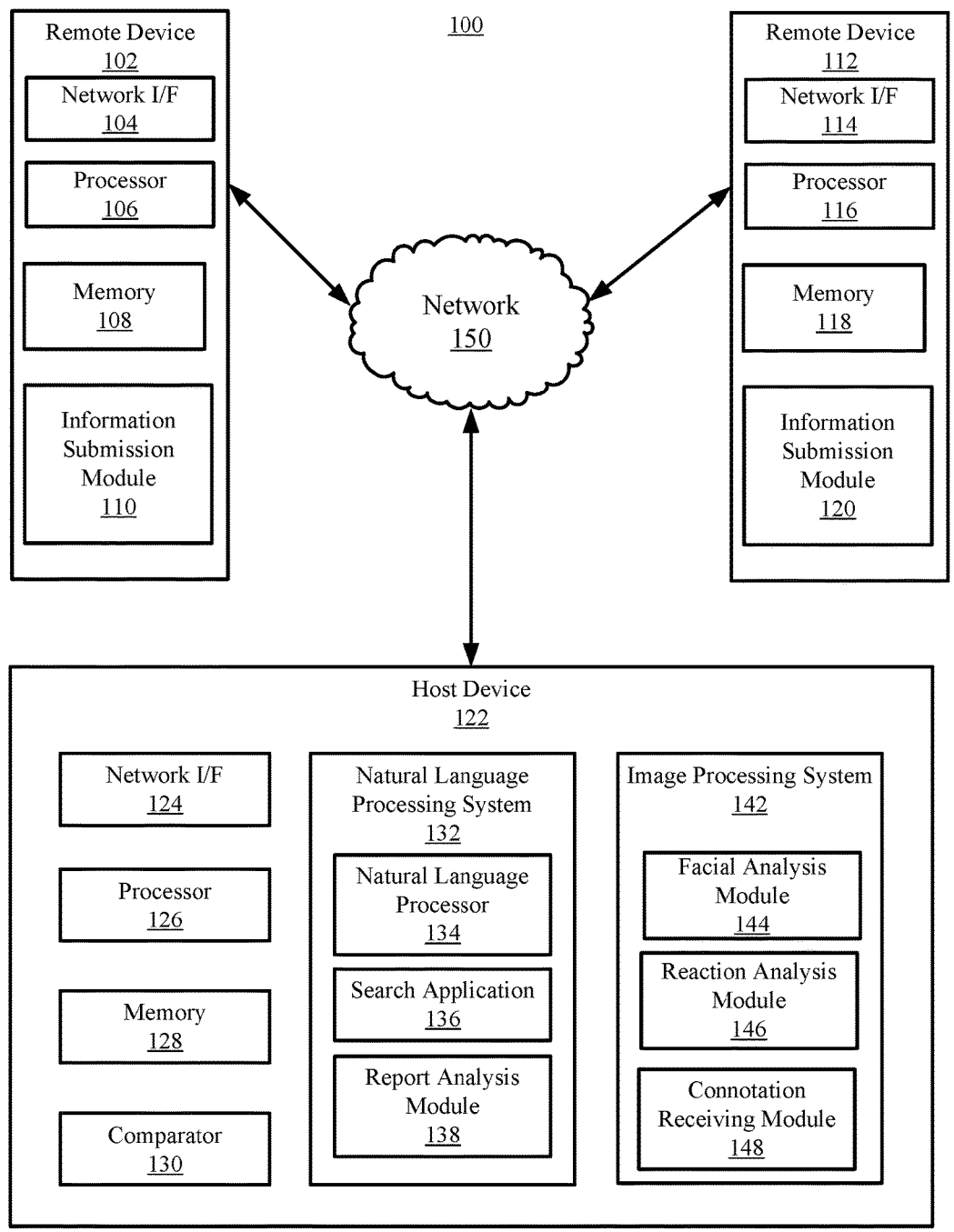
FIG. 1 depicts a block diagram of an example computing environment in which embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate to error message generation, and more particularly to customizing error messages based on the user. While the present disclosure is not necessarily limited to such applications, various aspects of the disclosure may be appreciated through a discussion of various examples using this context.

When an application encounters an error, the application often displays an error message detailing the error for the user. For example, a web browser may be directed to a non-existent website and consequently display a "HTTP 404 Not Found" error. An application that fails to initialize properly may display a relevant stop error message. These error messages are often associated with error classifications. For example, the "HTTP 404 Not Found" error is classified as a client error; it indicates that the connection between the client and server was successful, but that the URL entry made at the client is improper and does not represent a valid address. Error classifications may allow for error detection, tracking, and prevention. For example, errors may be recorded and tracked to determine that 90% of all errors occurring for a messenger application are, according to their classifications, server errors, which would allow for investigation of the server to further determine if the errors have a common cause.

These error classifications may also be compared to a message generation profile of a particular user to perform an error message modification assessment. A message generation profile may contain, for example, information regarding the user's skillset, skill level, and personality aspects. The message generation profile may be compiled using information from various sources. For example, in some embodiments, the user may have a subscription profile that allows access to various social channels associated with the user (e.g., social networking sites, messaging applications, forums, etc.), which may be analyzed using natural language processing techniques to populate information tables in the message generation profile. For example, the unstructured data from the user-associated social channels may be converted into structured data via natural language processing techniques.

An error message modification assessment may, for example, identify a standard error message for the particular error encountered and determine, based on the comparison of error classifications to user's message generation profile, whether the standard error message should be modified to provide a more tailored error message for the user. For example, it may be determined that a user has a low level of skill regarding networking technology and has a high affinity for humor. The error message modification assessment may determine to display a light-hearted or joking error message in lieu of the standard message. In another example, a user with a high degree of sophistication regarding networking technology with no affinity for humor may receive a concise error message with specific and detailed error codes in lieu of the standard message. The error message modification assessment may, for example, convert the information in a user's message generation profile and the information in error classifications into arrays of values. These arrays of values may be used to calculate a logical distance between the user's message generation profile and the error classifications. Logical distances meeting a threshold may indicate the desirability of using a tailored error message over the standard error message.

Once the tailored message is displayed to the user, the reaction of the user may be monitored for a predetermined time (e.g., reaction time) after the message display to determine the usefulness of the tailored message. For example, the social channels associated with the user may be monitored for a time after the tailored message is displayed to identify any reaction the user may have posted or to gauge the user's mood after encountering the tailored message. In another embodiment, the user's facial expressions may be monitored to determine the user's reaction using facial recognition technology. For example, in embodiments, a computer system equipped with a video capture device may monitor the face of the user during a reaction period after an error message is displayed to convert unstructured data associated with facial expressions into structured data the system can use to determine emotions experienced by the user and the intensities of those emotions. The captured video may be parsed and analyzed using facial recognition techniques to determine the facial expressions of the user during the reaction period. The facial expressions may be determined to be associated with various emotions and their intensities, either by using predetermined values, or by monitoring the user during emotional experiences to create a user-tailored facial expression profile. This facial expression data captured during a reaction period may then be structured and stored using such facial recognition techniques. In another embodiment, the user's activity in the application may be monitored to determine whether the user's use of the application increased, decreased, or ceased altogether.

A determination of the user's reaction may be saved for future reference in other error encounters. For example, if a user continues to use an application after encountering an error, a computer system may monitor the user's facial expressions indicating a positive reaction, and/or the computer system may monitor a user's positive posts on social channels within a reaction period. The mapping between the message generation profile and the error classifications may then be saved and used in future error encounters to generate similar tailored error messages. If, on the other hand, the user ceases using the application, has a facial expression indicating a negative reaction, or posts negatively on social channels within the reaction period, this feedback may be saved and used to update the personality aspects of the user's message generation profile.

As discussed above, some embodiments may use natural language processing. Accordingly, an understanding of the embodiments of the present disclosure may be aided by describing embodiments of natural language processing systems and the environments in which these systems may operate. Turning now to the figures, FIG. 1 illustrates a block diagram of an example computing environment 100 in which embodiments of the present disclosure may be implemented.

Consistent with various embodiments, the host device 122 and the remote devices 102 and 112 may be computer systems. The remote devices 102 and 112 and the host device 122 may include one or more processors 106, 116, and 126 and one or more memories 108, 118, and 128, respectively. The remote devices 102 and 112 and the host device 122 may be configured to communicate with each other through an internal or external network interface 104, 114, and 124. The network interfaces 104, 114, and 124 may be, e.g., modems or network interface cards. The remote devices 102 and 112 and/or the host device 122 may be equipped with a display or monitor. Additionally, the remote devices 102 and 112 and/or the host device 122 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote devices 102 and 112 and/or the host device 122 may be servers, desktops, laptops, or hand-held devices.

The remote devices 102 and 112 and the host device 122 may be distant from each other and communicate over a network 150. In some embodiments, the host device 122 may be a central hub from which remote devices 102 and 112 can establish a communication connection, such as in a client-server networking model. Alternatively, the host device 112 and remote devices 102 and 112 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote devices 102 and 112 and the host device 122 may be local to each other, and communicate via any appropriate local communication medium. For example, the remote devices 102 and 112 and the host device 122 may communicate using a local area network (LAN), one or more hardwire connections, a wireless link or router, or an intranet. In some embodiments, the remote devices 102 and 112 and the host device 122 may be communicatively coupled using a combination of one or more networks and/or one or more local connections. For example, the first remote device 102 may be hardwired to the host device 122 (e.g., connected with an Ethernet cable) while the second remote device 112 may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote devices 102 and 112 may enable users to submit (or may submit automatically with or without user input) information (e.g., message generation profiles, error classifications, facial image recognition data, etc.) to the host devices 122 in order to perform error message modification assessments, error message tailoring, and user reaction monitoring. For example, the remote devices 102 and 112 may include information submission modules 110 and 120 and a user interface (UI). The information submission modules 110 and 120 may be in the form of a web browser or any other suitable software module, and the UI may be any type of interface (e.g., command line prompts, menu screens, graphical user interfaces). The UI may allow a user to interact with the remote devices 102 and 112 to submit, using the information submission modules 110 and 120, information regarding error message generation (including message generation profiles, error classifications, user reaction assessments, etc.) to the host device 122.

In some embodiments, the host device 122 may include a natural language processing system 132. The natural language processing system 132 may include a natural language processor 134, a search application 136, and a report analysis module 138. The natural language processor 134 may include numerous subcomponents, such as a tokenizer, a part-of-speech (POS) tagger, a semantic relationship identifier, and a syntactic relationship identifier. An example natural language processor is discussed in more detail in reference to FIG. 2.

The search application 136 may be implemented using a conventional or other search engine, and may be distributed across multiple computer systems. The search application 136 may be configured to search one or more databases or other computer systems for content that is associated with a piece of information (such as a message generation profile) submitted by a remote device 102. For example, the search application 136 may be configured to search dictionaries, social channels, and/or archived information regarding a user's personality aspects, skillset, and skill level to help identify data relevant to performing an error message modification assessment.

The report analysis module 138 may be configured to analyze information from social channels (e.g., forum posts, social networking site profiles, instant messages, etc.) and error classifications (e.g., client error, server error, redirection error, stop error, etc.). The report analysis module 138 may include one or more modules or units, and may utilize the search application 136, to perform its functions (e.g., to identify a personality aspect, skillset, skill level, etc.), as discussed in more detail in reference to FIG. 2.

In some embodiments, the host device 122 may include a facial image processing system 142. The image processing system 142 may be configured to analyze facial images (e.g., still photos, frames from video content, etc.) to create a reaction analysis. The reaction analysis may identify a mood or emotion exhibited in the facial image(s) as determined by the image processing system 142. In other embodiments, the reaction analysis may identify a mood or reaction from a non-facial image, such as identifying a celebratory mood from an image containing balloons and cake. The image processing system 142 may utilize one or more models, modules, or units to perform its functions (e.g., to analyze the facial image and generate an image analysis). For example, the image processing system 142 may include one or more image processing modules that are configured to identify specific moods and emotions from a facial image. The image processing modules may include a facial analysis module 144 to analyze facial images to identify the presence, size, type, and location of facial features (e.g., eyebrows, laugh lines, teeth, etc.). As another example, the image processing system 142 may include a reaction analysis module 146 to identify the mood or emotion associated with an image analysis, and the degree of intensity associated with the mood or emotion (hereinafter, the determination of a mood/emotion and its intensity is referred to as a "connotation"). In some embodiments, the image processing modules may be implemented as software modules. For example, the image processing system 142 may include a facial analysis module and a reaction analysis module. In some embodiments, a single software module may be configured to analyze the image(s) using the image processing modules.

In some embodiments, the image processing system 142 may include a connotation receiving module 148. The connotation receiving module 148 may be configured to receive, from the natural language processing system 132 or the remote devices 102/112, images or video associated with a user's reaction to an error message, which have been posted to social channels associated with the user. The connotation receiving module 148 may then determine which modules within the image processing system 142 (e.g., the facial analysis module 144 and the reaction analysis module 146) should be used to analyze the received content. For example, the natural language processing system 132 may determine, from information on social channels, the user has reacted to a tailored error message. The post on social channels may be accompanied by an image of the user's facial expression. Accordingly, the connotation receiving module 148 may determine that an image analysis should be generated using the facial analysis module 144.

In some embodiments, the host device 122 may include a comparator 130. The comparator 130 may be configured to receive a connotation from the natural language processing system 132 and a connotation from the image processing system 142. The comparator 130 may be further configured to compare the two connotations to determine an average connotation. The comparator may be configured to notify the remote device 102 or 112, whichever transmitted the connotation information to the host device 122, of the average connotation.

While FIG. 1 illustrates a computing environment 100 with a single host device 122 and two remote devices 102 and 112, suitable computing environments for implementing embodiments of this disclosure may include any number of remote devices and host devices. The various models, modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to receive and analyze information from social channels, and the second host device may include a facial image processing system configured to receive and analyze images of facial expressions, to generate a connotation.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
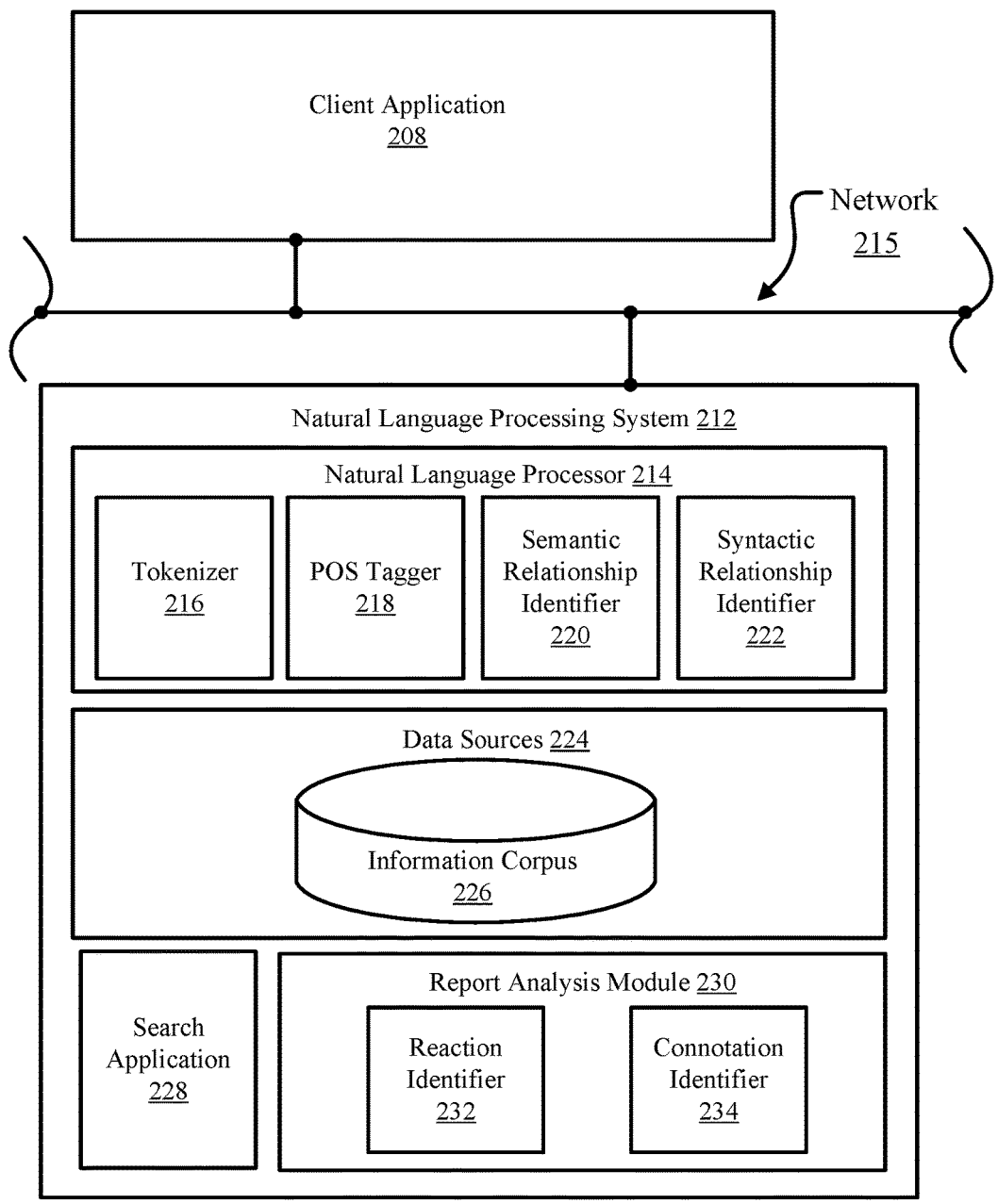
FIG. 2 illustrates a block diagram of an example natural language processing system configured to analyze text associated with a user to identify the user's skillset and personality aspects, in accordance with embodiments of the present disclosure.

FIG. 2 illustrates a block diagram of an exemplary system architecture 200, including a natural language processing system 212, configured to analyze text associated with a user to identify the user's skillset, skill level, personality aspects, and reactions to error messages in accordance with embodiments of the present disclosure. In some embodiments, a remote device (such as remote device 102 of FIG. 1) may submit information (such as social channel content) to be analyzed by the natural language processing system 212, which may be housed on a host device (such as host device 122 of FIG. 1). Such a remote device may include a client application 208, which may itself involve one or more entities operable to generate or modify information for a message generation profile that is then dispatched to a natural language processing system 212 via network 215.

Consistent with various embodiments, the natural language processing system 212 may respond to information submissions sent by a client application 208. Specifically, the natural language processing system 212 may analyze received content from social channels associated with the user to identify skillsets (e.g., education details, job functions, areas of technical expertise, etc.), skill levels (e.g., years of experience, depth of technical knowledge, etc.), personality aspects (e.g., humor-centric, enjoys high level of technical detail, likes animals, etc.), and reactions to tailored error messages. In some embodiments, the natural language processing system 212 may include a natural language processor 214, data sources 224, a search application 228, and a report analysis module 230. The natural language processor 214 may be a computer module that analyses the received content and other information. The natural language processor 214 may perform various methods and techniques for analyzing textual information (e.g., syntactic analysis, semantic analysis, etc.). The natural language processor 214 may be configured to recognize and analyze any number of natural languages. In some embodiments, the natural language processor 214 may parse passages of documents or content from social channels. These modules may include, but are not limited to, a tokenizer 216, a part-of-speech (POS) tagger 218, a semantic relationship identifier 220, and a syntactic relationship identifier 222.

In some embodiments, the tokenizer 216 may be a computer module that performs lexical analyses. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document and break any text passages within the document into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of a user's social network profile may shed light on the meaning of text elements of the user's posts on social channels). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by the natural language processing system 212.

In some embodiments, the semantic relationship identifier 220 may be a computer module that may be configured to identify semantic relationships of recognized text elements (e.g., words, phrases) in documents. In some embodiments, the semantic relationship identifier 220 may determine functional dependencies between entities and other semantic relationships.

Consistent with various embodiments, the syntactic relationship identifier 222 may be a computer module that may be configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

In some embodiments, the natural language processor 214 may be a computer module that may parse a document and generate corresponding data structures for one or more portions of the document. For example, in response to receiving a post on a social channel describing a user's frustration in response to a tailored error message at the natural language processing system 212, the natural language processor 214 may output parsed text elements from the post as data structures. In some embodiments, a parsed text element may be represented in the form of a parse tree or other graph structure. To generate the parsed text element, the natural language processor 214 may trigger computer modules 216-222.

In some embodiments, the output of natural language processor 214 may be used by search application 228 to perform a search of a set of (i.e., one or more) corpora to retrieve one or more pieces of content on social channels to send to an image processing system. As used herein, a corpus may refer to one or more data sources, such as the data sources 224 of FIG. 2. In some embodiments, the data sources 224 may include data warehouses, information corpora, data models, and document repositories. In some embodiments, the data sources 224 may include an information corpus 226. The information corpus 226 may enable data storage and retrieval. In some embodiments, the information corpus 226 may be a storage mechanism that houses a standardized, consistent, clean, and integrated list of conditions. The information corpus 226 may also store, for each condition, a list of associated criteria. For example, the information corpus 226 may include a list of emotions associated with reactions (e.g., frustration, joy, sadness, satisfaction, etc.). The data may be sourced from various operational systems. Data stored in the information corpus 226 may be structured in a way to specifically address reporting and analytic requirements. In some embodiments, the information corpus 226 may be a relational database.

In some embodiments, the report analysis module 230 may be a computer module that identifies a reaction and determines an associated connotation by analyzing content from social channels. In some embodiments, the report analysis module 230 may include a reaction identifier 232 and a connotation identifier 234. When social channel content containing a reaction to a tailored error message is received by the natural language processing system 212, the report analysis module 230 may be configured to analyze the content using natural language processing to identify a reaction and associated connotation. The report analysis module 230 may first parse the content using the natural language processor 214 and related subcomponents 216-222. After parsing the content, the reaction identifier 232 may identify one or more reactions present in the content. This may be done by, e.g., searching a dictionary (e.g., information corpus 226) using the search application 228. Once a reaction is identified, the reaction identifier 232 may be configured to transmit the condition to an image processing system (shown in FIG. 1) and/or to a comparator (shown in FIG. 1).

The connotation identifier 234 may identify a connotation (e.g., the emotion and degree of intensity associated with the reaction) in the reaction. This may be done, for example, by searching the reaction for words and phrases associated with emotions and adjectives associated with intensity. The known words and phrases may be found by searching through a list of words and phrases (e.g., a dictionary, a database of previously-analyzed reactions, etc.). If the reaction identifier 232 identifies a reaction containing, for example, the name of an application that recently encountered an error, a timestamp within a specified reaction monitoring period, or a reference to a particular error code or type, the connotation identifier 234 may search the reaction for words and phrases relating to emotions and intensity. In order to identify connotations associated with the reaction, the connotation identifier 234 may search the information corpus 226 using the search application 228 to receive a list of connotations often associated with the identified reaction. In some embodiments, the list of connotations may be predetermined. In some embodiments, the computer system may generate the list by analyzing a plurality of reactions. The connotation identifier 234 may then search, using natural language processing, the reaction for words or phrases associated with the list of connotations. After determining a connotation associated with the reaction, the connotation identifier 234 may be configured to transmit the connotation to an image processing system for association with a facial expression and/or to a comparator (both shown in FIG. 1).

Figure 3:
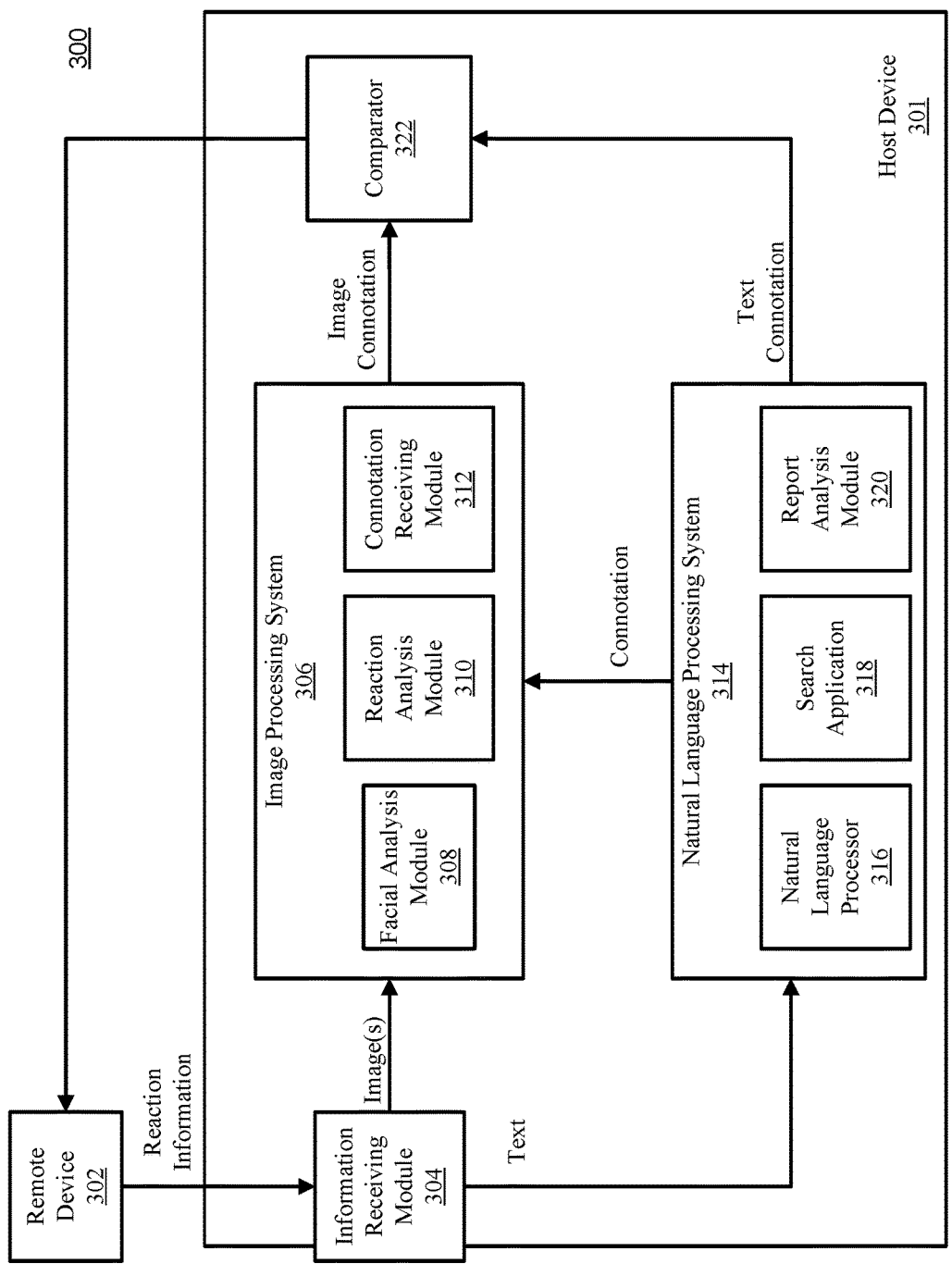
FIG. 3 illustrates a block diagram of an example high level logical architecture of a system for determining a user's reaction to an error message, in accordance with embodiments of the present disclosure.

Referring now to FIG. 3, shown is a block diagram of an example high level logical architecture of a system 300 for determining a user's reaction to an error message, in accordance with embodiments of the present disclosure. In some embodiments, the host device 301 and the remote device 302 may include the same components as the host device 122 and remote devices 102 and 112 of FIG. 1, respectively. A remote device 302 may submit reaction information to an information receiving module 304. The reaction information may include one or more pieces of content from social channels, such as a social network post with one or more associated images. The information receiving module 304 may be configured to receive the reaction information and to send the image(s) to the image processing system 306 and the text to the natural language processing system 314.

In some embodiments, the natural language processing system 314 may include the same modules and components as the natural language processing system 212 (shown in FIG. 2). The natural language processing system 314 may include, e.g., a natural language processor 316, a search application 318, and a report analysis module 320. The natural language processing system 314 may be configured to analyze the text of the reaction information to identify one or more reactions and one or more connotations associated with each reaction. After identifying a reaction and the associated connotation, the natural language processing system 314 may transmit the connotation to the image processing system of 306. The natural language processing system 314 may also transmit both the reaction and the connotation to a comparator 322.

In some embodiments, the image processing system 306 may include the same modules and components as the facial image processing system 142 (shown in FIG. 1). The image processing system 306 may include, e.g., a facial analysis module 308, a reaction analysis module 310, and a connotation receiving module 312. The connotation receiving module 312 may be configured to receive, from the natural language processing system 314, an identified reaction determined by analyzing one or more pieces of content from social channels. Based on the identified reaction, the connotation receiving module 312 may determine which image processing module should analyze the image(s) received from the information receiving module 304. For example, if the language processing system 314 reports that the reaction includes (an) image(s), the connotation receiving module 312 may call on the facial analysis module 308 to analyze the image(s).

In some embodiments, the image processing system 306 may have modules directed towards other types of images. For example, the image processing system 306 may have modules dedicated towards detecting and analyzing non-facial images (e.g., images of cakes, streamers, party hats, and other celebratory paraphernalia; images of angry emoticons, distressed cartoon characters; etc.). Many non-facial images may be associated with various connotations, and the present disclosure should not be limited to the particular examples described herein.

After the image processing system 306 has analyzed the received image(s) using an image processing module, it may transmit a connotation analysis to the comparator 322. The connotation analysis may include one or more image reactions and/or one or more connotations identified in the image(s). In some embodiments, the connotation analysis may only include the connotation determined by the image processing system 306. The comparator 322 may receive the connotation analysis and compare it to the reaction and/or connotation received from the natural language processing system 314. In some embodiments, the comparator will determine whether the textual connotation identified by the natural language processing system 314 and the image connotation determined by the image processing system 306 match. If they do not match, the comparator may flag the connotations as sub-optimal, and report this to the remote device 302 to aid in determining whether an error modification assessment meets a threshold, as discussed in the description of FIG. 4.

If the identified textual connotation matches the image connotation, the comparator 322 may compare the connotations to generate an average connotation. If the differences between the connotations are within a threshold, the comparator 322 may determine that the average connotation is accurate. For example, the natural language processing system 314 may indicate a reaction of satisfaction with an intensity of 4 on a scale of 1 to 5, with 5 being the most intense. The image processing system 306 may indicate a reaction of satisfaction with an intensity of 5 on that same scale. If the comparator is configured to use a threshold of identical reactions within 2 intensities of each other, it may determine that the average connotation is accurate. If the difference between the connotations is greater than the threshold, the comparator may flag the connotations and/or average connotation as sub-optimal, and report this to the remote device 302 to aid in determining whether an error modification assessment meets a threshold, as discussed in the description of FIG. 4.

Figure 4:
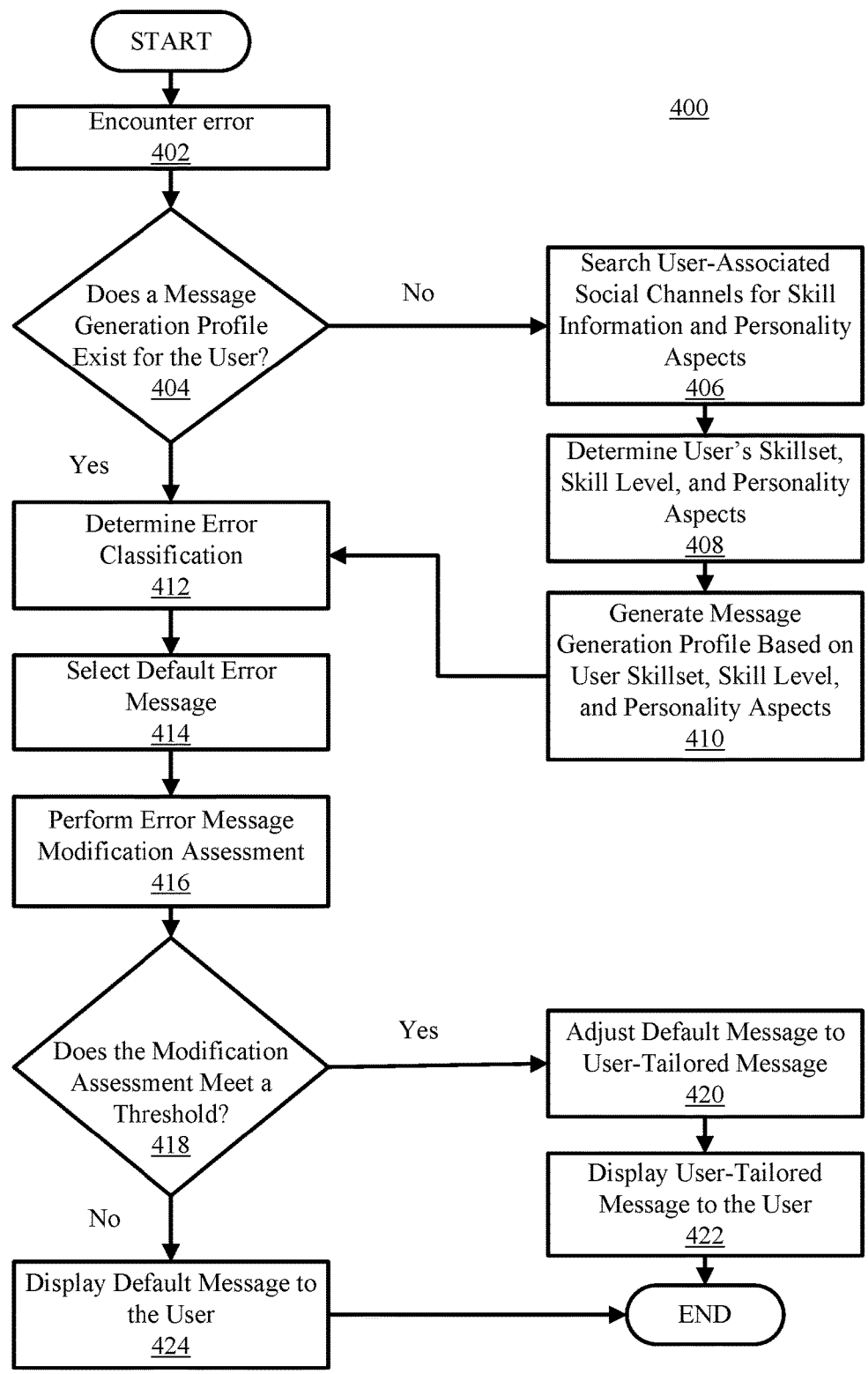
FIG. 4 illustrates a method for displaying a user-tailored message to a user, in accordance with embodiments of the present disclosure.

Referring now to FIG. 4, shown is a method for displaying a user-tailored message to a user, in accordance with embodiments of the present disclosure. In some embodiments, the method 400 may be performed by one or more computer systems. The method 400 may begin at operation 402, where a computer system identifies an error. The error may be associated with one or more error classifications. For example, the web browser on a computer system may encounter "Error 403—Access Forbidden" when attempting to access a specific URL. The error may be associated with one or more error classifications, such as client error, user input error, credential failure error, etc.

At 404, the system may determines whether a message generation profile exists for the user. A message generation profile may be, for example, an array of values representing the skillset, skill level, personality aspects, and/or connotations from previous reactions associated with the user. In other embodiments, a message generation profile may be a relational database containing information associated with a user's skillset, skill level, personality aspects, and connotations from previous reactions.

In response to a determination that no message generation profile exists, the system, at 406, may search through user-associated social channels for information regarding the user's skillset, skill level, and personality aspects. For example, the system may search a specific social network for a profile matching the user's identity. From the user's profile, the system may search for information regarding education, job functions and skills, endorsements from other users, etc. In other embodiments, the system may have information stored in a local database of users that may be searched for information regarding the user's skillset, skill level, and personality aspects. The system may be configured to search any number of social channels and databases, and combine the findings in a comprehensive search report.

At 408, the computer system may determine the skillset, skill level, and any personality aspects associated with the user from the search report. For example, the system may determine a user has a brain surgeon's skillset, with a very high level of skill from 25 years of practice, and that the user enjoys golf, alpine skiing, modern dance, and fine art, as evidenced from the user's membership in various groups on the social channel(s).

At 410, the system may generate a message generation profile for the user, based on the information regarding the user's skillset, skill level, and personality aspects, as discussed herein.

In response to a determination that a message generation profile exists for a user, at 412, the system may determine the error classifications associated with the error encountered. For example, an error related to a missing .dll file may be classified as an operating system error, an application error, functionality error, etc. In other embodiments, the error classifications may be represented as numerals. For example, an "EXCEPTION_ACCESS_VIOLATION," on some operating systems, is associated with the error code "c0000005." The error code may be used alone or in conjunction with descriptive terms to establish an error classification.

At 414, the system may select a default error message. A default error message may be included in the application's programming, or may be generated using generic and neutral language, generally applicable for any user. For example, the default error message for a web browser's 404 error may be "404 PAGE NOT FOUND."

At 416, the system may perform an error modification assessment. The error modification assessment may be performed by comparing the user's message generation profile to the error's classifications to generate a user-tailored message that incorporates references to the user's personality aspects and an appropriate technical description of the error, as determined by evaluating the user's skillset and skill level. The comparison may compare text to determine identical word matches. In other embodiments, the comparison may compare arrays of values that represent the error classifications to arrays of values representing the relevant information in the user's message generation profile. Such a comparison may use distance metrics to determine a logical distance between the error classifications and the user's message generation profile. The system may be configured to receive information regarding the connotations of a user's past reactions for consideration in determining whether the threshold is met. For example, if a previous user-tailored message results in a sub-optimal connotation, as discussed herein, a value representing this connotation in the modification assessment may be adjusted to reflect the sub-optimal status, thereby impacting the resulting threshold determination. For example, if a previous user-tailored message contained a picture of a jellyfish, and the user frowned, or otherwise exhibited a negative connotation, the value representing jellyfish may be adjusted downward. Potential messages containing jellyfish would then be less likely to meet the threshold requirement compared to messages containing other animals or objects that have not had a downward adjustment in value.

At 418, the system may determine whether the modification assessment met a threshold. For example, a threshold may be a match of at least 4 terms in the error classifications with the terms contained in the user's message generation profile. In other embodiments, the threshold may be a logical distance value.

In response to a determination that the modification assessment threshold was not met, the system may display the default error message to the user at 424. For example, if the threshold is a match of at least 2 terms between the error classifications and the user's message generation profile, and there are no matching terms, the system may display the default error message to the user.

In response to a determination that the modification assessment threshold was met, the system, at 420, may adjust the default message to a user-tailored message. The user-tailored message may incorporate one or more references to the user's personality aspects and may adjust the level of technical detail associated with the error if the user's message generation profile indicates a relevant skillset and skill level. For example, a web browser may encounter a "408 REQUEST TIMEOUT" error. A user-tailored message for a user with skillset including technical networking expertise with a high skill level, and no recorded personality aspects may read: "408—REQUEST TIMEOUT WHILE WAITING FOR SERVER." The tailored message may incorporate elements of standard error messages and modify them based on information in a user's message generation profile, such as including relevant and more-detailed technical data, such as the address of the non-responding server, the amount of time the application has spent waiting, the size of the packet that was sent, etc.

At 422, the system may display the user-tailored message to the user. For example, an interactive user interface may produce an information window, line of text, status alert, etc. and display it through a monitor for the user's perception.

Figure 5:
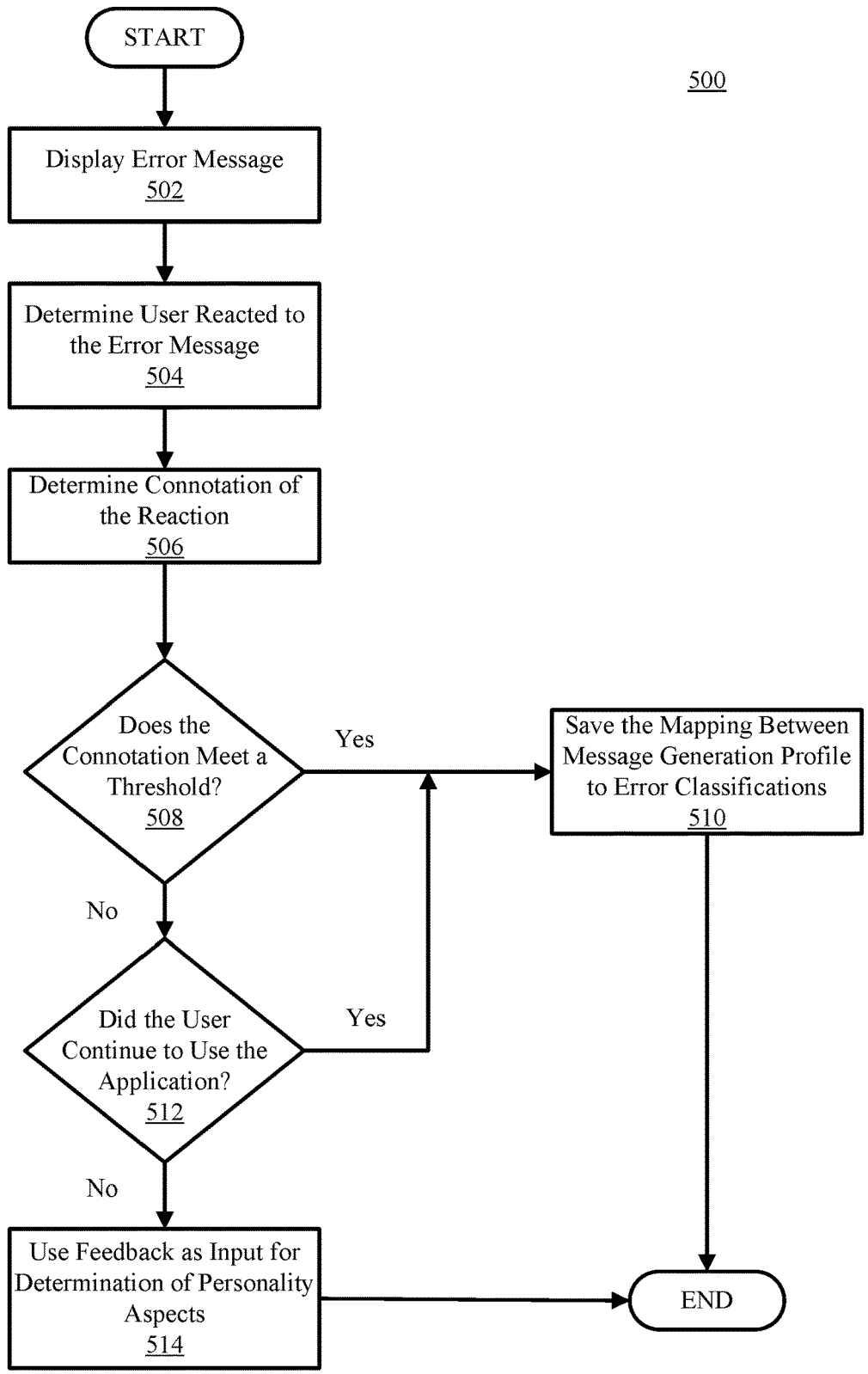
FIG. 5 illustrates a method for using user reactions to refine a message tailoring process, in accordance with embodiments of the present disclosure.

Referring now to FIG. 5, shown is a method for using user reactions to refine a message tailoring process, in accordance with embodiments of the present disclosure. In some embodiments, the method 500 may be performed by one or more computer systems. The method 500 may begin at operation 502, where a computer system may display an error message to a user, such as the error message displayed at 422 in FIG. 4.

At 504, the system may determine the user reacted to the error message. For example, the system may search and analyze social channels associated with the user as described in FIG. 1-3. In other embodiments, the system may directly record the user's reaction using, for example, a webcam or microphone.

At 506, the system may determine a connotation of the user's reaction. For example, the system may determine a connotation as described in FIG. 1-3. In other embodiments, the system may use a direct recording of the user's reaction, as described above, in conjunction with a system, such as the system from FIG. 3, to generate a connotation of the user's reaction.

At 508, the system may determine whether the connotation meets a threshold. A threshold may be, for example, the absence of a sub-optimal flag, as discussed herein. A threshold may be, for example, a connotation associated with a positive emotion, having an intensity of at least 75, on a scale of 100, where 100 is the most intense.

In response to determining the connotation meets a threshold, the system, at 510, may save the mapping between the user's message generation profile and error classifications for use in future modification assessments. For example, if the connotation meets a threshold of a positive emotion, have an intensity of at least 75 of 100, where 100 is the most intense, the system may associate the modification assessment used in generating the user-tailored message, thereby allowing the system to forego the modification assessment associated with future error encounters associated with the same error message generation profile and error classifications.

In response to determining the connotation does not meet a threshold, the system, at 512, may go on to determine whether the user continued to use the application. For example, a user may experience a neutral or negative reaction/connotation to a tailored error message, as determined by methods described herein. For example, if a user experiences a neutral or negative reaction/connotation, but continues to use the application, it may indicate that the reaction is attributable to a source outside the application and/or error message. As such, determining whether a user continued to use an application may, in some embodiments, be a suitable alternative for determining whether a connotation met the threshold.

In some embodiments, in response to a determination that the user continued to use the application, the system proceeds to operation 510, as described herein.

In response to determining that the user did not continue to use the application, the system, at 514, may use this feedback as input to adjust the values and/or words associated with the user's personality aspects. For example, if a user discontinued using an application shortly after encountering a tailored error message, it may indicate dissatisfaction on the part of the user. The system may record that the error message displayed should not be displayed to the user again, and/or flag a connotation used in the message generation process as sub-optimal. In other embodiments, the system may adjust the values in the array of values representing the personality aspects considered during the modification assessment to give those personality aspects less weight in future modification assessments.

Figure 6:
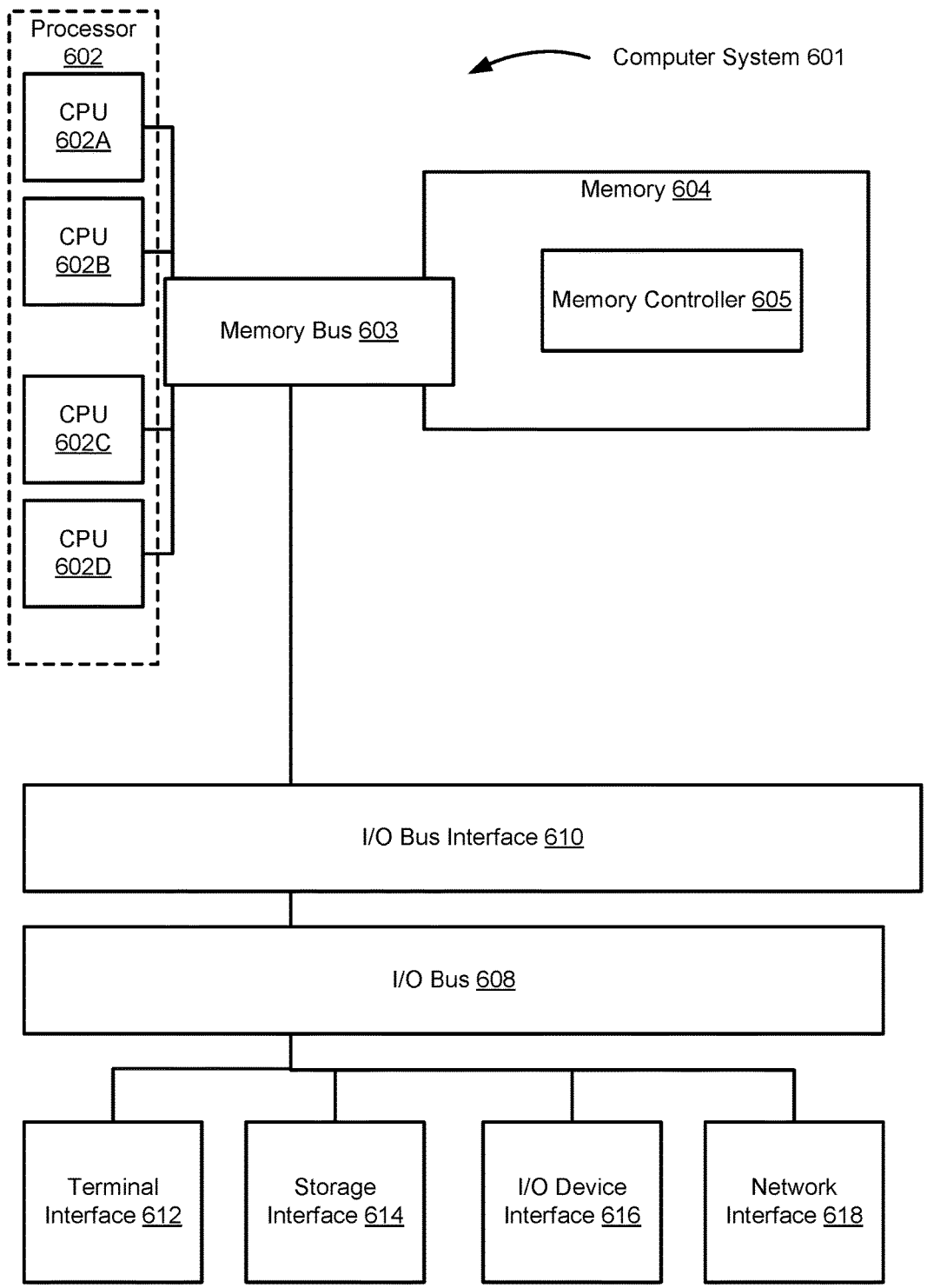
FIG. 6 illustrates a high-level block diagram of an example computer system that may be used in implementing embodiments of the present disclosure.

Referring now to FIG. 6, shown is a high-level block diagram of an example computer system (i.e., computer) 601 that may be configured to perform various aspects of the present disclosure, including, for example, methods 400/500, described in FIG. 4 and FIG. 5, respectively. The example computer system 601 may be used in implementing one or more of the methods or modules, and any related functions or operations, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601, and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 604 may contain elements for control and flow of memory used by the CPU 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating error messages, the method comprising:
   receiving information about a user;
   analyzing the information to form a message generation profile tailored to the user; wherein the message generation profile includes a set of personality aspects associated with the user;
   responsive to detecting an error in an application, determining a default message and a classification of the error;
   comparing the message generation profile to the default message and the classification of the error to form a modification assessment;
   responsive to determining the modification assessment meets a predetermined threshold, adjusting the default message to a user-tailored message and notifying the user of the error using the user-tailored message;
   monitoring for a feedback associated with the user-tailored message, wherein the feedback is used to adjust at least one personality aspect of the set of personality aspects associated with the user; and
   recording the feedback in the message generation profile tailored to the user to adjust the user's subsequent modification assessments.

2. The method of claim 1, wherein monitoring for feedback on the user-tailored message comprises:
   monitoring one or more facial expressions of the user to record a reaction to the tailored message;
   determining a connotation of the reaction; and
   determining a degree of intensity of the reaction.

3. The method of claim 1, wherein receiving information about the user comprises:
   receiving information derived from social channels associated with the user.

4. The method of claim 1, wherein analyzing the information to form the message generation profile tailored to the user comprises:
   identifying content generated by the user; and
   analyzing the user's generated content to identify personality aspects of the user.

5. The method of claim 1, wherein analyzing the information to form the message generation profile tailored to the user comprises:
   determining the user's skillset and skill level.

6. The method of claim 1, wherein monitoring for feedback on the user-tailored message comprises:
   determining a user reaction to the tailored message on social channels.

7. The method of claim 6, further comprising:
   in response to determining the user reaction to the tailored message on social channels, determining a connotation of the reaction; and
   determining a degree of intensity of the reaction.

8. The method of claim 1, wherein adjusting at least one personality aspect of the set of personality aspects associated with the user further comprises:
   in response to receiving the feedback, modifying a value representing the personality aspect, in accordance with the feedback.

9. The method of claim 8, wherein the feedback includes the user's facial image recognition data recorded during a reaction period.

10. A system for generating error messages, the system comprising:
    a memory with program instructions stored thereon; and
    a processor in communication with the memory, wherein the system is configured to perform a method, the method comprising:
      receiving information about a user;
      analyzing the information to form a message generation profile tailored to the user; wherein the message generation profile includes a set of personality aspects associated with the user;
      responsive to detecting an error in an application, determining a default message and a classification of the error;
      comparing the message generation profile to the default message and the classification of the error to form a modification assessment;
      responsive to determining the modification assessment meets a predetermined threshold, adjusting the default message to a user-tailored message and notifying the user of the error using the user-tailored message;
      monitoring for a feedback associated with the user-tailored message, wherein the feedback is used to adjust at least one personality aspect of the set of personality aspects associated with the user; and
      recording the feedback in the message generation profile tailored to the user to adjust the user's subsequent modification assessments.

11. The system of claim 10, wherein monitoring for feedback on the user-tailored message comprises:
    monitoring one or more facial expressions of the user to record a reaction to the tailored message;
    determining a connotation of the reaction; and
    determining a degree of intensity of the reaction.

12. The system of claim 10, wherein receiving information about the user comprises:
    receiving information derived from social channels associated with the user.

13. The system of claim 10, wherein analyzing the information to form the message generation profile tailored to the user comprises:
    identifying content generated by the user; and
    analyzing the user's generated content to identify personality aspects of the user.

14. The system of claim 10, wherein analyzing the information to form the message generation profile tailored to the user comprises:
    determining the user's skillset and skill level.

15. The system of claim 10, wherein monitoring for feedback on the user-tailored message comprises:
determining the user reacted to the tailored message on social channels.

16. The system of claim 15, further comprising:
in response to determining the user reacted to the tailored message on social channels, determining a connotation of the reaction; and
determining a degree of intensity of the reaction.

17. The system of claim 10, wherein adjusting at least one personality aspect of the set of personality aspects associated with the user further comprises:
in response to receiving the feedback, modifying a value representing the personality aspect, in accordance with the feedback.

18. The system of claim 17, wherein the feedback includes the user's facial image recognition data recorded during a reaction period.

19. A computer program product for generating error messages, the computer program product comprising a computer readable storage medium having program instructions embodied therewith, the program instructions executable by a device to cause the device to:
receive information about a user;
analyze the information to form a message generation profile tailored to the user, wherein the message generation profile includes a set of personality aspects associated with the user;
responsive to detecting an error in an application, determine a default message and a classification of the error;
compare the message generation profile to the default message and the classification of the error to form a modification assessment;
responsive to determining the modification assessment meets a predetermined threshold, adjust the default message to a user-tailored message and notify the user of the error using the user-tailored message;
monitor for a feedback associated with the user-tailored message, wherein the feedback is used to adjust at least one personality aspect of the set of personality aspects associated with the user; and
record the feedback in the message generation profile tailored to the user to adjust the user's subsequent modification assessments.

20. The computer program product of claim 19, wherein monitoring for feedback on the user-tailored message comprises:
monitoring one or more facial expressions of the user to record a reaction to the tailored message;
determining a connotation of the reaction; and
determining a degree of intensity of the reaction.

* * * * *